Nov. 30, 1965     A. C. ARBOGAST     3,220,098
METHOD AND MEANS FOR FORMING TUBULAR
FITTINGS WITH SOLDER RINGS
Filed March 19, 1962     3 Sheets-Sheet 1
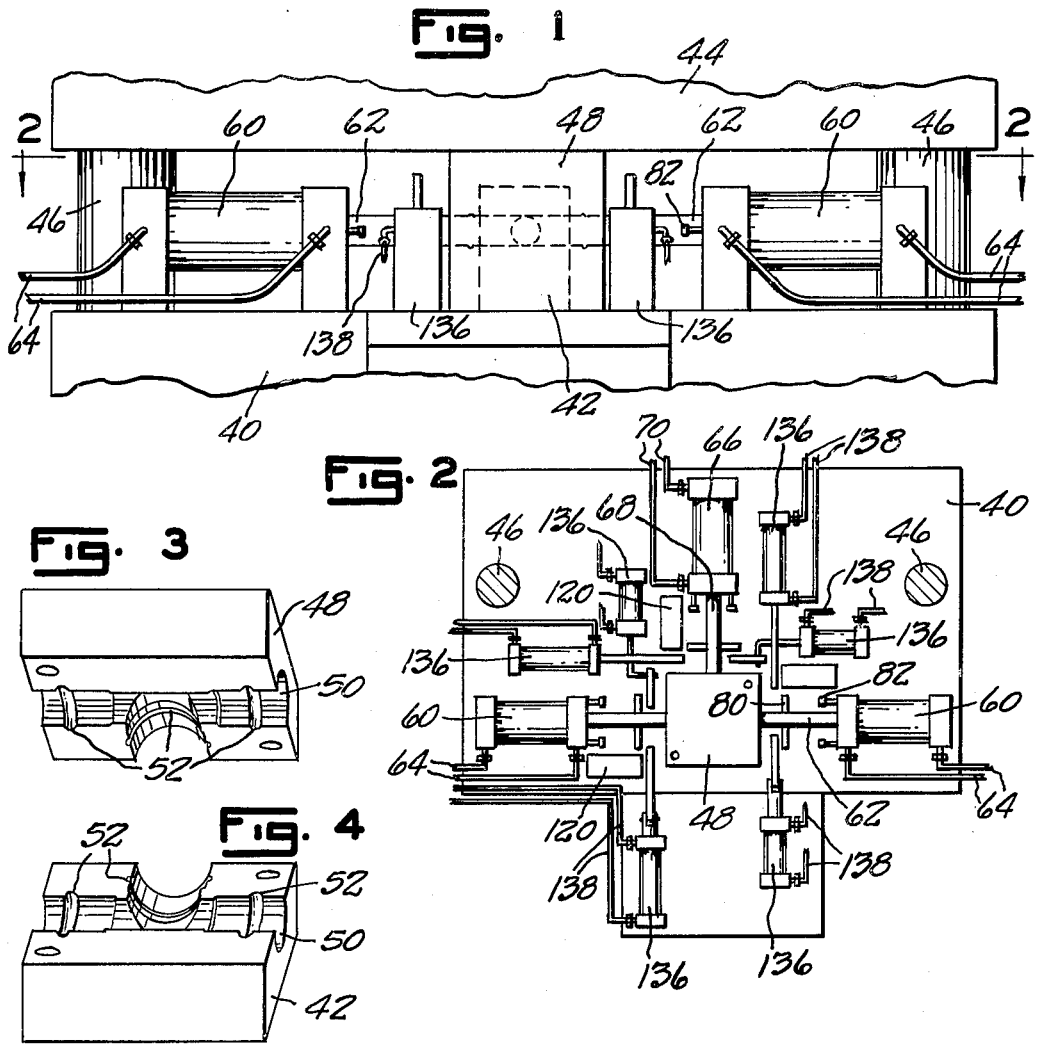
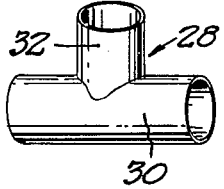
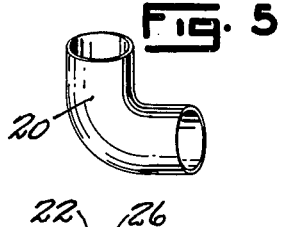
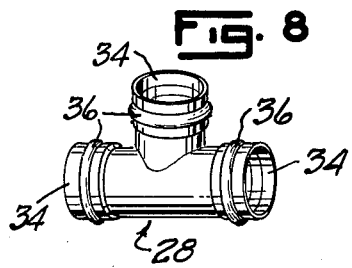
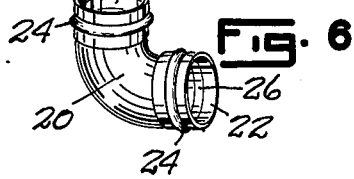
INVENTOR.
ALFRED C. ARBOGAST
BY
Eugene C. Knoblock
ATTORNEY

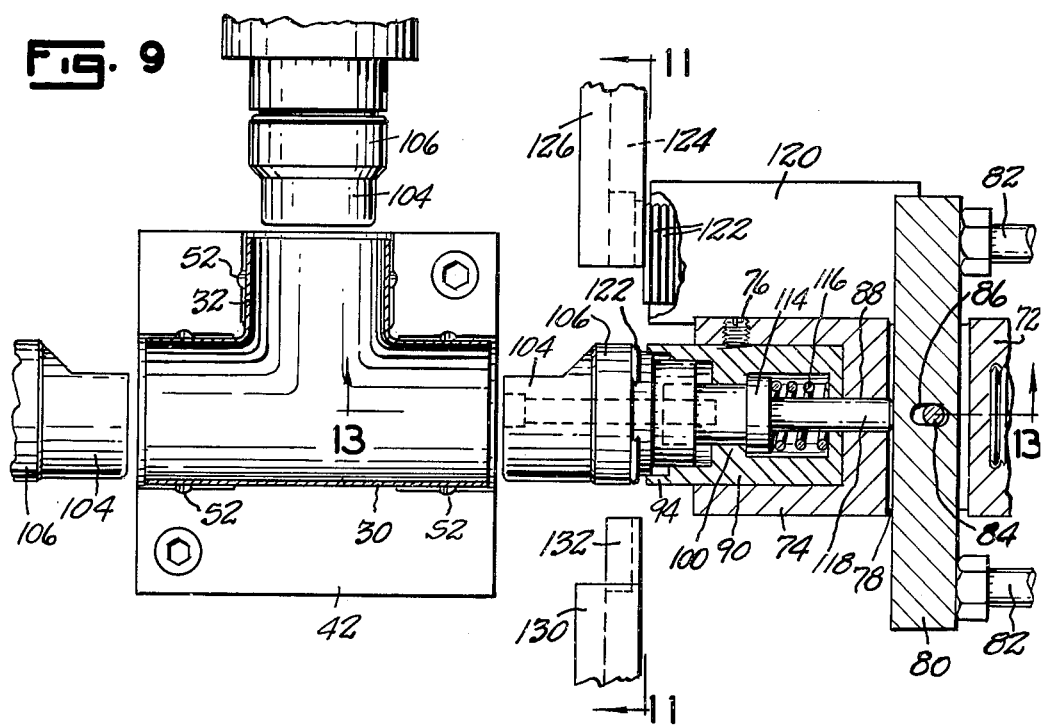
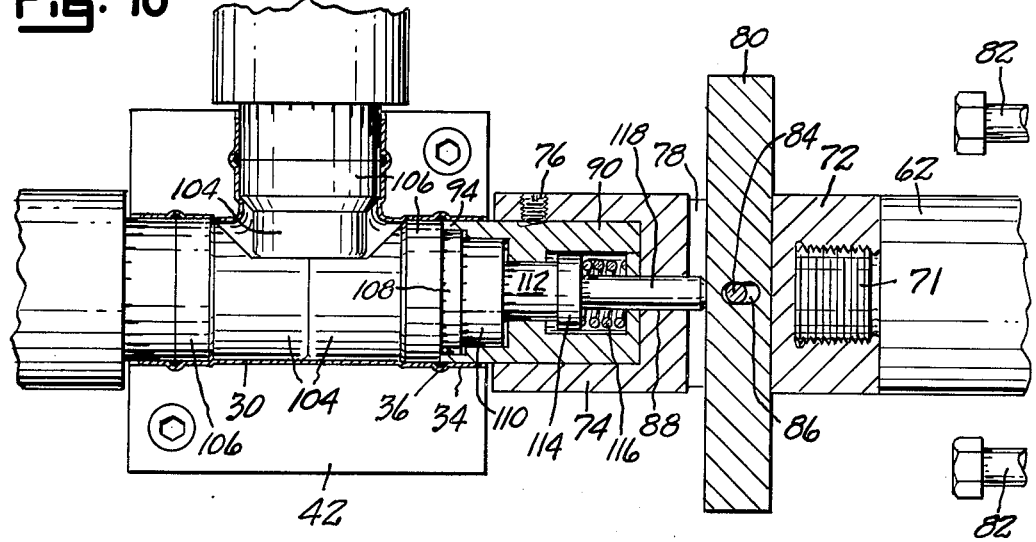

Nov. 30, 1965 A. C. ARBOGAST 3,220,098
METHOD AND MEANS FOR FORMING TUBULAR
FITTINGS WITH SOLDER RINGS
Filed March 19, 1962 3 Sheets-Sheet 3
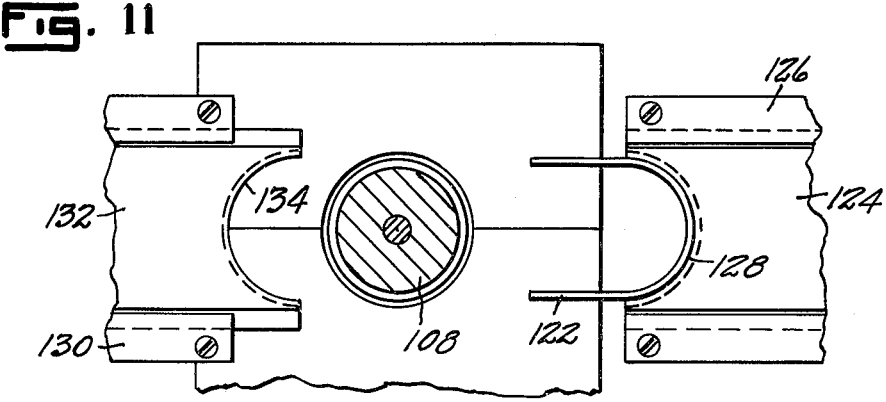
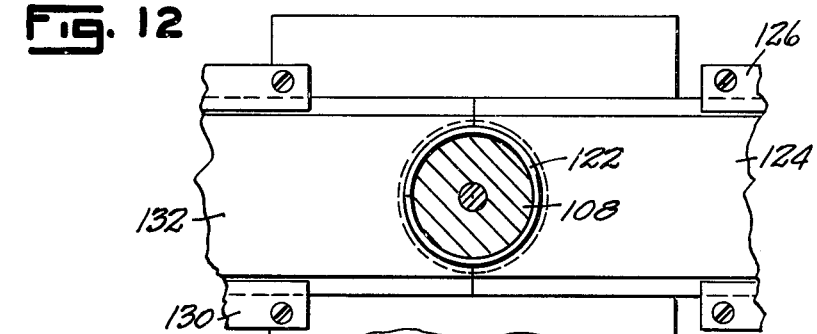
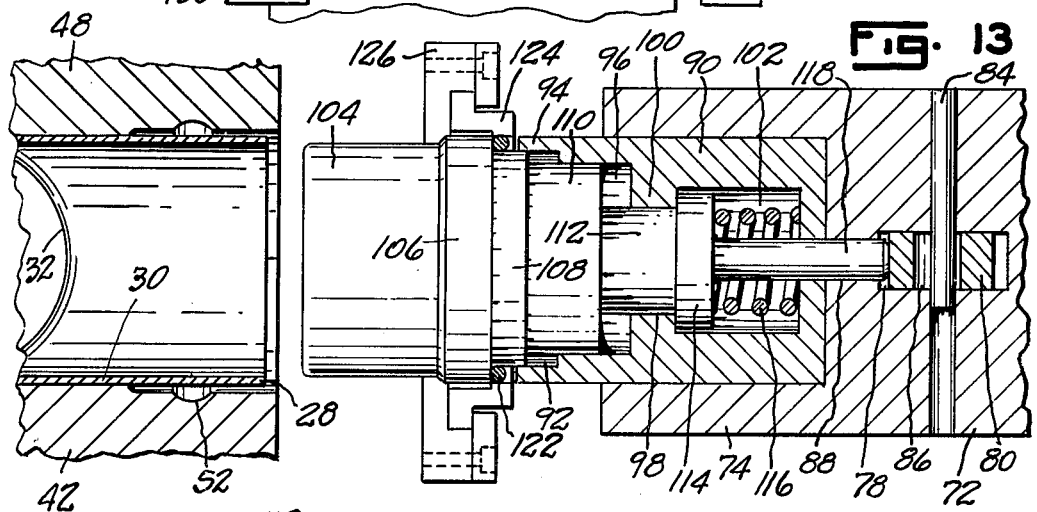
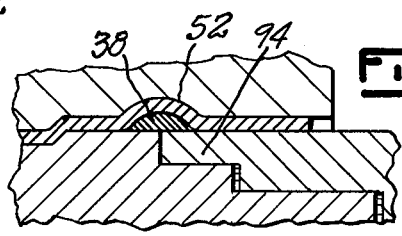
INVENTOR.
ALFRED C. ARBOGAST
BY
Eugene C. Knoblock
ATTORNEY United States Patent Office 3,220,098
Patented Nov. 30, 1965

3,220,098
METHOD AND MEANS FOR FORMING TUBULAR FITTINGS WITH SOLDER RINGS
Alfred C. Arbogast, 1511 Greenleaf Blvd., Elkhart, Ind.
Filed Mar. 19, 1962, Ser. No. 180,712
12 Claims. (Cl. 29—157)

This invention relates to improvements in method and means for forming tubular fittings with solder rings, and more particularly, for forming tube fittings with circumferential beads receiving and retaining solder or like sealing material used to join and seal the interfitting portions of male and female tubes and fittings.

The primary object of this invention is to provide a novel, simple and rapid method of forming a circumferential bead in a tubular member at a preselected location and of preselected dimension and of introducing therein a filler of solder or sealing material.

A further object is to provide a method wherein an annular member of solder is inserted at a selected position within a fitting, then is expanded radially outwardly to deform the fitting into selected beaded contour, and finally is trimmed substantially flush with the adjacent inner surface of the fitting.

A further object is to provide means for forming a circumferential bead in a tubular fitting and inserting a filler in said fitting bead, wherein a separable die has a die cavity adapted to receive a tubular work piece and grooved to the contour of the fitting bead desired, and a plunger is advanced into a work piece in the die cavity and into engagement with abutment means while carrying a ring of deformable incompressible filler material, said plunger being operable to extrude said filler material radially to deform said tubular work piece into the bead-outlining groove of the die cavity, and to trim said extruded filler substantially flush with the inner surface of the fitting as it is withdrawn from the work piece.

A further object is to provide apparatus of this character utilizing a separable die having a die cavity of selected configuration and receiving a work piece and a plunger, wherein the plunger comprises relatively shiftable interfitting parts spring-urged to a normal position and shiftable by pressure to extrude a filler annulus thereon uniformly radially to deform the work piece and entrap the filler within the deformed portion of the work piece.

A further object is to provide a device of this character having a two-part plunger whose parts telescope and are normally spring-urged to an extended position, and novel means for mounting upon said plunger at a groove-defining portion thereof between confronting abutments on said interfitting parts an annulus of a deformable filler material.

Other objects will be apparent from the following specification.

In the drawings:

FIG. 1 is a fragmentary front elevation of apparatus employed to form a T fitting;

FIG. 2 is a reduced view taken on line 2—2 of FIG. 1;

FIG. 3 is a perspective view of a top die member employed in forming a T fitting;

FIG. 4 is a perspective view of a bottom die member used in forming a T fitting;

FIG. 5 is a perspective view of an angle fitting blank;

FIG. 6 is a perspective view of a finished angle fitting having circumferential beads containing filler material;

FIG. 7 is a perspective view of a blank of a T fitting;

FIG. 8 is a perspective view of a T fitting in finished form with circumferential beads containing a filler material;

FIG. 9 is an enlarged view taken on the plane of the parting surface of the dies in FIG. 1, and illustrating one step in the method of forming a circumferential bead on a T fitting;

FIG. 10 is a view similar to FIG. 9 but illustrating the plungers in filler extruding position;

FIG. 11 is a view taken on line 11—11 of FIG. 9, and illustrating the manner of feeding the filler material to the filler shaping means;

FIG. 12 is a view similar to FIG. 11 but illustrating the filler shaping means in operative position to shape a filler in annular form around the working plunger;

FIG. 13 is an enlarged sectional view taken on line 13—13 of FIG. 9, and illustrating the construction of the plunger; and FIG. 14 is an enlarged detail sectional view illustrating the formation of the filler receiving bead and the manner in which the filler is confined therein.

Referring to the drawings, and particularly to FIGS. 5 to 8, inclusive, the numeral 20 designates a tubular elbow which may be formed of brass, copper, aluminum, steel or any other material capable of being worked while cold. The fitting is preferably wrought. FIG. 6 illustrates the finished form of a fitting after being worked by my method and apparatus from the blank 20 and being characterized by enlarged or bell ends 22 having an inner diameter sufficiently large to receive the end of a tubular member with a snug telescoping fit. Circumferential bead grooves 24 are formed in the bell end parts 22 intermediate the length thereof and are filled with a solder or other filler material 26 whose inner surface is cylindrical and substantially flush with the inner surface of the adjacent portions of the bell end 22. In FIG. 7 is illustrated a T blank 28 which is preferably a wrought fitting formed of brass, copper, aluminum, steel or other material capable of being worked while cold and which is characterized by a cross head portion 30 and a perpendicular leg portion 32. FIG. 8 illustrates the finished form of the T fitting after the same has been worked by my method to provide on each end of the cross head 30 and on the end of the perpendicular leg a bell portion 34 which is interrupted by a circumferential bead 36 containing a filler material 38. It will be understood that the fittings shown in FIGS. 6 and 8 are illustrative of the type of fittings which may be worked by my method and apparatus, and it will be understood that said figures are not limiting inasmuch as the method and apparatus may be used with fittings of other types and shapes and with tubular or cylindrical parts.

Referring to FIGS. 1, 2, 9 and 10, which illustrate the apparatus for forming the T fittings shown in FIG. 8, the numeral 40 designates the bottom platen of a machine, such as a press, which serves to mount a bottom die member 42, such as is illustrated in FIG. 4. The machine is also provided with an upper platen 44 shiftable by power relative to the lower platen 40 by any suitable means, not shown, and under the guidance or control of pins or guides 46. The upper platen 44 mounts an upper die member 48, such as that illustrated in FIG. 3.

Each of the die members 42 and 48 has a die cavity 50 formed in its parting face and conforming to the desired configuration of the work piece to be formed. In the form shown where the die is to form a T-shaped work piece, the die cavities 50 will be interrupted by enlarged transverse groove portions 52 at selected points at which the beads 36 are to be formed on the fitting as produced; for example, adjacent but spaced from the end edges of the cross head 30 and of the leg 32 of the blank of the T fitting. The cooperating die cavities will be of such configuration as to receive and snugly confine and retain a work piece or blank therein when subjected to expanding pressures, for which purpose the presser machine will be provided with means (not shown)

for exerting sufficient pressure upon the movable platen 44 to insure that the parting faces of the die sections 42 and 48 will be held in firm abutment during the application of internal expanding pressure therein.

The press or other machine which mounts the die parts 42 and 48 also carries a plurality of power members or actuators arranged in selected orientation to the die cavity 50 of the fixedly mounted die, such as the lower die 42. As here illustrated, these actuators consist of fluid pressure responsive members which preferably are double acting cylinders. Thus, in forming a T fitting, a pair of similar cylinders 60 are mounted upon the machine, as on the platen 40, in axial alignment with the straight cavity portion 50 within which the cross head 30 of the work piece 28 is received. Each of the cylinders 60 has a piston (not shown) slidable therein, to which piston is connected an elongated piston rod or plunger 62 arranged to extend coaxially with the adjacent aligned portions of the die cavity. Fluid pressure lines 64 connect the actuators 60 to a suitable control valve (not shown) in a fluid pressure circuit or system in which fluid pressure of a predetermined value is available. A third fluid pressure actuator 66 is axially aligned with the perpendicular portion of the die cavity and has a piston (not shown) from which projects a piston rod or plunger 68 coaxially with the perpendicular leg of the die cavity. Fluid pressure lines 70 connect the actuator 66 to a pressure source and control therefor.

Each of the plungers 62 and 68 is preferably of the construction best illustrated in FIGS. 9, 10 and 13, being characterized by telescopically interfitting relatively slidable and spring-urged parts adapted in their normal position to provide a circumferential groove intermediate the length of the plunger assembly. In the particular construction shown, each plunger or piston rod preferably has a reduced diameter screw-threaded end portion 71 upon which is mounted a bar or extension 72 having a screw-threaded bore receiving the piston rod portion 70. The extension 72 preferably has an axial bore in its free end defining a socket portion 74 which may have one or more screw-threaded apertures therein to receive set screws 76. The extension 72 preferably has a transverse passage 78 therethrough within which may be mounted a cross bar 80 which fits with clearance therein and preferably projects laterally therefrom and is adapted to engage fixed stops 82 carried by a fixed part of the press and adapted to trip the cross bar 80, for purposes to be described. The cross bar 80 may have a pin and slot connection 84 and 86 with the extension 72 accommodating movement of the transverse member lnegthwise of the extension 72. The extension 72 will also preferably have a bore 88 axially thereof and communicating with the transverse passage 78 and the interior of the socket 74.

A female plunger part 90 is mounted in the socket 74 and projects therefrom. The member 90 preferably has a large diameter concentric bore portion 92 at its outer or free end which defines a thin or narrow lip 94 and which communicates with a bore portion 96 of lesser diameter also concentric with part 90. The bore of the part 90 has a substantially reduced diameter portion 98 defining an annular internal abutment 100 intermediate its ends. The portion 102 of the bore of the member 90 is of greater diameter than bore portion 98 and is coaxial with the same and with the bore 88.

A male plunger part has a telescopic fit within the part 90 and, as here shown, preferably includes a head 104 having an outer diameter accommodating a snug sliding fit thereof within the axially aligned portion of the tubular work piece 28. In spaced relation to its free end the head 104 has a circumferential enlargement 106 provided with a beveled leading edge and an outer diameter which substantially conforms with the desired inner diameter of the bell portion of the tubular work piece to be formed, such as the bell 34 of the T fitting. A portion 108 of the plunger is adapted to have a snug sliding fit in the bore portion 92 of the part 90 and preferably is of a length slightly less than the axial dimension of the bore portion 92. A part 110 of the male plunger has a snug sliding fit in the bore portion 96 of the part 90 and is preferably of an axial dimension substantially equal to the axial dimension of the bore portion 96. A portion 112 of the male plunger has a snug sliding fit within the bore 98 of the part 90 and has an axial dimension substantially greater than the axial dimension of the bore portion 98. A circumferential flange portion 114 of the male plunger has a snug sliding fit in the bore 102 of the part 90 and is urged normally against the annular internal abutment 100 of the part 90 by spring means, such as coil spring 116, within the bore 102 of the part 90. The male plunger part terminates in a stem portion 118 having a sliding fit in the bore 88 and is of a length to project therethrough and into the passage 78 when the circumferential flange 114 bears against the circumferential internal abutment 100, as illustrated in FIG. 13.

Each telescopic plunger assembly has a stroke imparted thereto by the actuator 60 or 66, sufficient to permit the free end of the head 104 to engage an abutment within the work piece when the outermost edge of the annular or circumferential head enlargement 106 registers with the groove 52 in the portion of the die cavity into which the particular plunger extends, as illustrated in FIG. 10, while the telescopic plunger unit is held in its fully extended position, illustrated in FIGS. 9 and 13, by the spring 116. Further movement of the actuator for the plunger produces a telescoping action of telescoping plunger parts against the action of the spring 116, as illustrated in FIG. 10.

Suitable means are provided for causing a ring of filler or sealer material, such as solder or the like, to encircle the portion 108 of the plunger head while the plunger is in a retracted position, as illustrated in FIGS. 9 and 13, that is, a position in which the plunger has been withdrawn from the die cavity and the tubular work piece mounted therein. One form which this filler feeding means may take is illustrated in FIGS. 2, 9, 11, 12 and 13. A cartridge 120, containing a supply of U-shaped members 122 formed of solder material or other deformable and incompressible new resilient sealing material is positioned alongside the path of movement of a carrier member 124 and serves to press the outermost U-shaped member 122 in said cartridge against said carrier. The carrier 124 is slidable in a guide 126 in a direction perpendicular to the axis of the telescoping plunger assembly adapted to enter the die cavity. The slide carrier 124 is characterized by a socket portion 128 at its leading end into which a U-shaped solder member 122 is adapted to be pressed when the slide carrier 124 is in its retracted position, as illustrated in FIG. 11. A second guide 130 is mounted in alignment with the guide 126 at the opposite side of the telescoping plunger assembly and mounts a forming member 132 having a concave semicircular leading forming edge 134 adapted to engage the leading ends or free ends of a U-shaped solder member 122 when the carrier 124 and the forming member 132 are moved into end abutment, as illustrated in FIG. 12. The forming edge 134 of the member 132 bends the solder member 122 to define a continuous solder ring encircling the portion 108 of the head 104 of the plunger which enters the die cavity. If desired, power actuators 136, such as double-acting fluid pressure members (not shown), may be connected to the slide carrier 124 and the forming member 132 to advance and retract the same in predetermined timed relation to the actuation of the press platen 44 and the forming plunger actuators 60 and 66. For this purpose the actuators 136 may be connected by fluid pressure lines 138 to suitable timing means and controls (not shown) in a control system or circuit.

The method by which the fitting is formed with a circumferential bead 36 and a filler 38 is as follows: A work piece or blank, such as the elbow 20 or the T 28, is mounted in the cavity of a die having the desired configuration to provide for the formation of the bead therein or of a bell and a bead, and the separable parts of the die are then closed and held closed firmly. A ring of solder or other sealing material is then applied around a plunger between abutments of relatively shiftable telescopically interfitting parts thereof and the plunger is then advanced into the die and into the fitting within that die until the head of the plunger strikes an abutment at a time when the ring of solder is positioned within the die in the plane of the bead-defining groove in the die cavity. Thereupon, the continued application of pressure to the outer end of the telescopic plunger will cause relative movement of the telescoping parts so as to squeeze the ring of solder or sealing material axially thereof and cause it to be displaced substantially uniformly radially outwardly. The portion of the plunger fitting within the tubular fitting has a snug fit therein, and the extrusion of the solder ring by the parts of the telescopic plunger acts radially against the fitting at a point at which it is free to expand by virtue of the provision of the groove 52. Consequently, the extrusion of the filler material causes deforming of the fitting to enter the groove with the solder filling the interior of the bead as the bead is formed in the fitting. The volume of the solder ring will be carefully selected to permit displacement of solder sufficient to form the desired bead in the fitting and to fill that bead with solder. When this has been accomplished, the telescopic plunger is withdrawn and the innermost end or head portion 106 of the plunger head will serve to trim the solder filler material, as illustrated in FIG. 14, as it is withdrawn, so that the filler material will be substantially flush with the inner surface of the fitting adjacent thereto.

If desired, the operation of forming a bell and upon the tubular part of a fitting may be performed substantially simultaneously with the formation of the solder bead and the filling of that bead. Thus where a bell is to be formed, the head of the telescoping plunger may be configured to have a leading end portion, such as portion 104, and a bell-forming shoulder portion 106 extending annularly therearound and having a diameter equal to the desired inner diameter of the bell to be formed. In this case, the head 104 serves as a pilot to enter the open end of the portion of the fitting which is to be reshaped. The annular enlargement 106 is then forced into the open end of the fitting to expand the same into the desired bell shape and to bring the solder ring into the plane of the groove in which the bead is to be formed. Then the squeezing of the solder ring ensues, extruding the solder radially outwardly to form the bead 36 in the bell shaped portion and to fill that bead as it is formed with the solder material. When the bell has been reshaped to completely form the bead to the desired configuration and to fill the same, the plunger is withdrawn and the portion 106 of the head trims the interior of the filler material.

The method above described is readily accomplished by the apparatus above described, as follows: When the upper part or movable platen 44 of the press is moved to open the press and separate the dies 42 and 48, a work piece is inserted in the die cavity. At the same time the telescoping plungers will all be withdrawn from the outline of the die, as illustrated in FIGS. 9 and 11, to positions at which rings of solder or sealing material 122 are mounted thereon at suitable receiving grooves between the parts 94 and 106 of the telescoping interfitting parts of the plunger. This operation is accomplished by inserting, either manually or automatically, a U-shaped solder member 122, as illustrated in FIG. 11, into the leading end of the slide carrier 124, and then advancing the slide carrier 124 and the complementary forming member 132 toward the plunger so as to cause the solder member 122 to straddle the telescoping plunger and then reshape itself to ring form encircling the plunger, as illustrated in FIG. 12. Thereupon, the members 124 and 132 are withdrawn to the FIG. 11 position clear of the path of movement of the telescoping plunger.

With the mounting of the work piece in the die and the closing of the die and the encircling of the telescoping plungers by solder rings or rings of sealing material, the device is ready for the fixture shaping function. This has been illustrated in FIG. 10 with respect to a T fitting and entails inward advance of the telescoping plungers into the ends of the parts 30 and 32 of the work piece until the heads 104 abut each other, as illustrated in FIG. 10. This occurs at a time when the outermost edge of the annular enlargement 106 registers with the bead-forming groove 52 of the die cavity. In the case where the bell ends 34 are to be formed, the enlarged portion 106 will have formed these bells in the enlarged part of the die cavity, as illustrated in FIG. 10. Until the ends of the heads 104 of the telescoping plungers abut, as illustrated in FIG. 10, the springs 116 will have served to hold the telescopically interfitting plunger parts in their extended position so as to protect the solder ring against deforming of squeezing action prior to the time that the ring moves into the plane of the groove 52 of the die cavity. When this position of the solder ring is reached, further application of pressure to the female part of the telescoping plunger by actuation of the actuators 60 and 66 produces a squeezing action upon the solder, extruding it radially outwardly so as to deform the bell-shaped part of the fitting into a bead of the desired configuration and to fill that bead with the filler material. When the operating stroke of the actuators 60 and 66 has been completed, the withdrawal stroke will take place, pulling the telescoping plunger from the die cavity and trimming the inner surface of the solder filler 38. It will be observed that as the extruding of the solder took place, the stem 118 of the male part of the telescopic plunger, in moving against the action of the spring 116, moved the cross bar 80 in the passage 78 from the position shown in FIG. 9 to the position shown in FIG. 10. The solder remaining within the collapsible groove between the parts 94 and 106 may tend to bind the telescoping parts together with a bond greater than the spring 116 can dislodge. Should this occur, the telescoping parts would be freed to return to their normal position to define a groove to receive another charge or ring of solder when the ends of the cross bar 80 abut the stops 82 at the end of the retracting stroke of the plunger. Then it will be apparent that the device is conditioned for another operation by the simple expedient of removing the formed fitting when the dies are opened, placing therein a new blank fitting and mounting another solder ring in the collapsing groove of the telescoping forming plunger.

While the preferred embodiments of the invention have been illustrated and described, it will be understood that changes may be made in the invention within the scope of the appended claims without departing from the spirit of the invention.

I claim:

1. The method of forming an enlarged bell and a circumferential bead on a metal tubular member, consisting of the steps of positioning said tubular member in the cavity of a die conforming in shape to the desired contour of said bell and circumferential bead, forcing into said tubular member a plunger having a contour corresponding to the desired inner shape of said bell to form a bell on the end of said member, said plunger being encircled by a ring of deformable incompressible non-resilient filler material and an annular follower, pressing said annular follower relative to said plunger and against said ring while in the plane of said bead-outlining die cavity portion to extrude said ring and reshape said bell into conformity with said bead-outlining die cavity portion, and withdrawing said plunger endwise from said tubular member while retaining said extruded ring therein.

2. The method of making a tubular fitting, consisting of the steps of confining a tubular member in the cavity of a die having an enlarged bell-defining portion interrupted by a bead-defining groove, inserting into said member a multi-part telescopic plunger defining a groove to first expand said member radially into a bell shape and then to position said plunger groove in the plane of said die cavity groove while a ring of non-resilient incompressible filler material encircles said plunger groove, extruding said ring outwardly by relative longitudinal movement of said plunger parts toward each other to reshape the bell portion of said member into conformity with said groove, and withdrawing said plunger endwise from said tubular member while retaining said extruded ring in said re-shaped bell portion.

3. In combination,
a separable die having a die cavity shaped to receive a tubular member,
at least one part of said die cavity being open at a side of said die and having a circumferential groove therein,
a two-part plunger aligned with said open ended die cavity and slidable in a tubular member within said cavity,
one of said plunger parts being shiftable lengthwise of the other and cooperating therewith to define a circumferential groove adapted to receive a ring of deformable incompressible non-resilient material,
means for clamping said dies in closed position, and means for advancing said shiftable plunger part to reduce said plunger groove axially and extrude said ring radially outwardly in the plane of the groove of said die and for withdrawing said plunger from said die to provide an interior surface finish on said extruded ring.

4. In combination,
a multi-part separable die having a die cavity formed partly in each die part and shaped to receive a tubular member,
said die cavity having at least two intersecting runs open at side faces of said die and each interrupted by a circumferential groove,
a plunger having a head part aligned with each open run and slidable snugly in a tubular member in said cavity and a reduced diameter part,
an annular member slidable on the reduced diameter part of each plunger to form a circumferential groove to receive a ring of deformable incompressible non-resilient material and snugly slidable in said tubular member, and
means for advancing said plungers into said tubular member and into abutment with each other and then advancing said annular member on each reduced plunger part to extrude said ring outwardly and radially while in the plane of a groove, asid last named means being operable to withdraw said plunger relative to said tubular member and said extruded ring.

5. In combination,
a multi-part separable die having a die cavity formed partly in each die part and shaped to receive a tubular member and interrupted by a circumferential groove,
a plunger aligned with said die cavity and slidable snugly in a tubular member in said cavity,
said plunger including a pair of telescopically interfitting parts cooperating to define a circumferential groove adapted to receive a ring of deformable incompressible non-resilient material, and
means for axially advancing said plunger into said tubular member and then advancing one of said plunger parts relative to the other while said ring is positioned in the plane of said die groove to reduce said groove axially and radially outwardly extrude said ring, said last named means being operable to withdraw said plunger from said tubular member and trim the inner surface of said extruded ring therein.

6. In combination,
a multi-part separable die having a die cavity formed partly in each die part and shaped to receive a tubular member,
said die cavity having at least two runs open at two faces of said die and each interrupted by a circumferential groove,
a plunger aligned with each open run and slidable snugly therein,
each plunger including a pair of telescopically interfitting parts cooperating to define a circumferential groove adapted to receive a ring of deformable incompressible non-resilient material, and
means for advancing said plungers into end engagement in said cavity and tubular member and for retracting said plungers from said cavity and tubular member,
said advancing means having a stroke advancing one part of each plunger after said plungers engage, whereby said circumferential groove is reduced axially to extrude said ring in the plane of said die groove, said plungers trimming the inner surfaces of said extruded rings upon reaction from said tubular members.

7. The combination defined in claim 6, wherein spring means normally urge said plunger parts to groove-defining position.

8. The combination defined in claim 6, and
means for returning said plungers to groove-defining positions while retracting said plungers from said die and tubular member.

9. In combination,
a multi-part separable die having a die cavity formed partly in each die part and shaped to receive a tubular member,
said die cavity having at least two runs open at two faces of said die and each interrupted by a circumferential groove,
a plunger aligned with each open run and slidable snugly therein,
each plunger including a pair of telescopically interfitting parts cooperating to define a circumferential groove,
means for advancing said plungers into end engagement in said cavity and tubular member and for retracting said plungers from said cavity and tubular member, and
means for applying a ring of deformable incompressible non-resilient material on each plunger at said plunger groove while in retracted position,
said advancing means having a stroke to squeeze said ring between the parts of each plunger while said plungers engage and said ring is positioned in the plane of said die groove to extrude said ring and reshape said tubular member, said advancing means trimming said extruded ring as it is retracted.

10. The combination defined in claim 9, wherein said ring applying means includes
a carrier shiftable perpendicularly to said plunger at its retracted position and having a ring-blank-receiving socket at its leading end and
a ring former aligned with and shiftable in the plane of said carrier and socket in opposite relation to said carrier and having a ring shaping leading end,
the leading ends of said carrier and former encircling the socket portion of said plunger in one position thereof.

11. In combination,
a multi-part separable die having a die cavity formed partly in each die part and shaped to receive a tubular member, said die cavity having an enlarged end portion interrupted by a circumferential groove, a power actuated plunger aligned with said run and having an end portion fitting snugly in the tubular member and a concentric enlarged portion for expanding said tubular member in said enlarged cavity portion as said plunger is advanced, said plunger having a reduced diameter portion extending outwardly from said enlarged portion, an annular member slidable on said reduced plunger portion and normally cooperating therewith to define an annular groove adapted to receive a ring of deformable incompressible non-resilient material, and means for advancing said annular member realtive to said plunger when said plunger is positioned in said cavity with said ring positioned in the plane of said die groove, whereby said ring is extruded radially to reform said tubular member in conformity with said die groove, said plunger trimming the interior of said extruded ring at it is withdrawn from said tubular member and ring.

12. The combination defined in claim 11, wherein resilient means urges said annular member to groove-defining position on said plunger.

References Cited by the Examiner

UNITED STATES PATENTS

| 677,930 | 7/1901 | Burton | 153—79 |
| 1,370,074 | 3/1921 | Vasselli. | |
| 1,754,922 | 4/1930 | Weldon. | |
| 1,921,188 | 8/1933 | Ireland | 113—44 |
| 1,973,436 | 9/1934 | Hjort | 29—550 |
| 2,120,067 | 6/1938 | Gray et al. | 29—157 X |
| 2,329,000 | 9/1943 | Rembert | 29—451 |
| 2,458,854 | 1/1949 | Hull et al. | 153—73 |

FOREIGN PATENTS

| 154.375 | 12/1953 | Australia. |
| 28,641 | 1903 | Great Britain. |

WHITMORE A. WILTZ, *Primary Examiner.*